United States Patent [19]

Lee

[11] 4,412,689
[45] Nov. 1, 1983

[54] FOLDING SUPPORT FRAME FOR STROLLER OR THE LIKE

[76] Inventor: Byron D. Lee, 5010 Cactus Pl., Prescott, Ariz. 86301

[21] Appl. No.: 259,033

[22] Filed: Apr. 30, 1981

[51] Int. Cl.³ .......................... B62B 7/08; B62B 7/12
[52] U.S. Cl. .................................... 280/648; 211/172; 248/326; 280/47.18; 280/47.37 R; 403/377; 403/391
[58] Field of Search ....................... 280/648, 642–644, 280/647, 658, 47.18, 47.38, 108, 391, 47.37 R; 248/326, 333–338; 403/377–379, 328, 109; 297/171; 211/172; 217/60 F

[56] References Cited

U.S. PATENT DOCUMENTS

| 577,220 | 2/1897 | Whitehead | 403/391 |
| 2,616,719 | 11/1952 | Heideman | 280/648 |
| 2,961,248 | 11/1960 | Meyers | 280/47.37 R |
| 3,019,028 | 1/1962 | Hedstrom | 280/648 |
| 3,550,998 | 12/1970 | Boudreau | 280/650 |
| 3,847,406 | 11/1974 | Burnham | 280/644 |
| 4,072,319 | 2/1978 | Berger | 280/47.37 R |

FOREIGN PATENT DOCUMENTS

| 2306653 | 11/1976 | France | 280/652 |
| 1126122 | 9/1968 | United Kingdom | 280/47.26 |

Primary Examiner—Joseph F. Peters, Jr.
Assistant Examiner—Timothy Roesch
Attorney, Agent, or Firm—James F. Duffy

[57] ABSTRACT

An upper U-shaped slide member and a lower U-shaped slide member are slidably coupled to form a generally rectangular framework. For storage, the upper and lower slide members are moved toward each other to reduce the size of the generally rectangular framework. A U-shaped rotating support member is pivotally coupled to said U-shaped slide members. Linkages couple the rotating support member to the lower U-shaped slide member and cause the rotating support member to rotate to a storage position when the lower slide member is slidingly moved with respect to the upper slide member. The linkages also move the rotating support member to a supporting position when the lower slide member is itself extended to a supporting position. Wheels coupled to the rotating support member and/or the lower slide member provide ease of movement of the frame. Extending the upper slide member provides a handle whereby the frame may be maneuvered readily. A load support coupled to the frame permits ready support of loads of varying characteristics, e.g. infant seats or child carriers.

20 Claims, 9 Drawing Figures

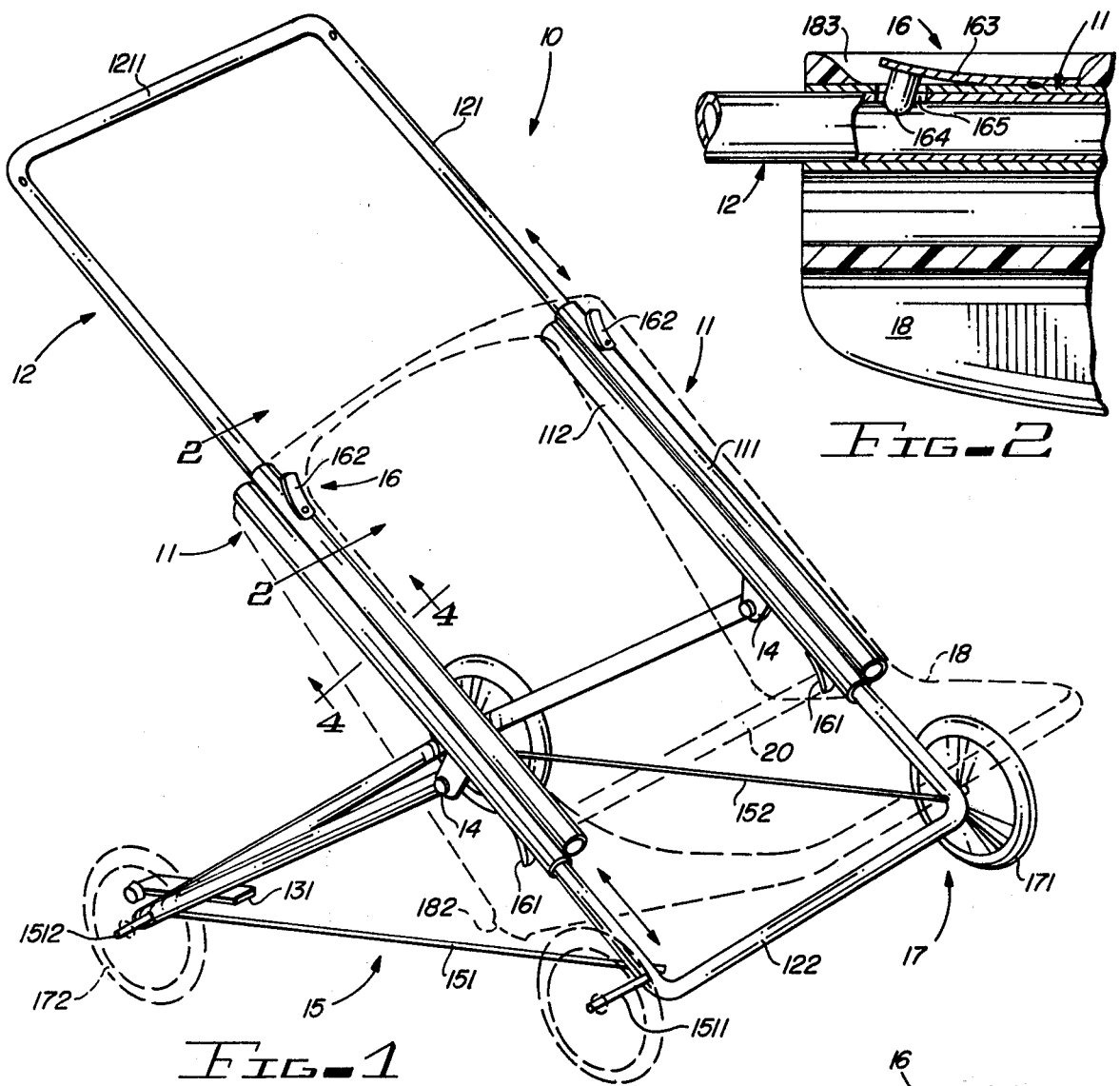
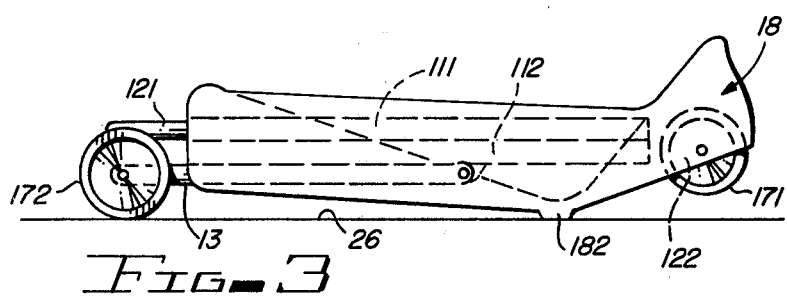
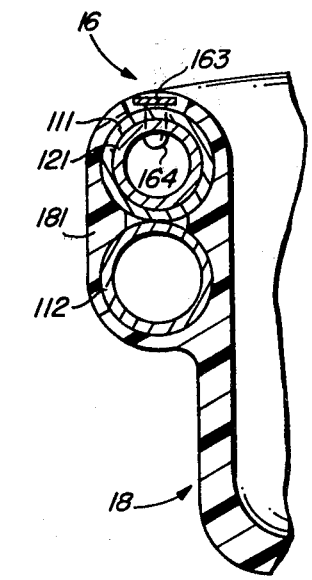

FOLDING SUPPORT FRAME FOR STROLLER OR THE LIKE

DESCRIPTION

1. Technical Field

The invention relates to the field of folding framework support structures. In particular, the invention relates to folding support structures for use with baby strollers or carriages.

2. Background Art

Because baby carriages and strollers present a significant storage problem in the home, significant effort has been expended in the past to provide support framework which will permit the carriages and strollers to be folded into a more compact unit. Typical of such a foldable carriage is the U.S. patent issued to Boudreau et al. on Dec. 29, 1970; U.S. Pat. No. 3,550,998. The framework is comprised of a plurality of rigid members pivotably interconnected to permit the frame and the infant support to fold down into a compact package.

Other examples of the prior art combine both pivotably foldable members with a sliding structure to achieve such a compact package. Typical of this approach are the four United States patents set forth hereinafter: Heideman, U.S. Pat. No. 2,781,225, Feb. 12, 1957; Thomas, U.S. Pat. No. 2,850,076 Sept. 3, 1957; Boudreau, U.S. Pat. No. 3,669,463, June 13, 1972; and Hyde et al., U.S. Pat. No. 4,065,177, Dec. 27, 1977.

The Hyde et al. and the 1970 Bondreau et al. patents disclose the use of rigid infant seats on a fold-down support frame.

Since the known prior art makes use only of a single sliding member, the length of the folded package will, in general, be determined by the length of the non-sliding member unless pivotable folding means are incorporated therein.

It is an objective of the invention to provide a fold-down support frame which takes utmost advantage of size reduction available by utilizing sliding components.

It is a particular objective of the invention to provide slide means which will accommodate both the support frame handle member as well as the lower support member of the frame.

It is another objective of the invention to provide a fold-down stroller in which the folded framework only slightly exceeds the length of the infant seat supported by said framework.

Another specific objective of the invention is the provision of an infant seat supported by a fold-down frame such that the infant seat may readily be utilized on a tabletop or other surface when the frame is in its folded position.

DISCLOSURE OF THE INVENTION

A folding support frame is comprised of two dual slide means, each comprised of a pair of slide conduits. A first slide member to be utilized as an upper support member or handle of the framework is slidably coupled into one end of each of the dual slide means. A second slide member, constituting the lower support structure of the frame, is slidably coupled to the other end of each of the dual slide means. A rotating lower support is pivotably coupled to each of the dual slide means and linkages pivotably couple said rotating support means to said second slide member such that withdrawing said second slide member from said dual slide means causes the rotating support means to pivot about its pivotable coupling with said dual slide means. Locking means are provided to fixedly position each of said slide members within said dual slide means. Wheel means are affixed to at least one of said second slide members and said rotating support means to provide for ease of movement of the frame over the ground or other support surface. In a preferred embodiment of the invention disclosed herein, the wheels are affixed to extensions of the linkages which pivotally couple said rotating support means and said second slide member. These extensions serve as axles for the wheels. Load supporting means are coupled to the framework to support a load. In the case of an infant seat, the infant seat is supported between the two dual slide means. Other load support means than that of an infant seat may be provided such as foldable shopping baskets, dolly work surfaces, saddle carriers' and display board supports may be utilized with the folding support frame disclosed herein.

BRIEF DESCRIPTION OF THE DRAWINGS

FIG. 1 is a perspective drawing of the folding support frame of the invention illustrating the dual slide conduits, upper and lower sliding support members and rotary support member.

FIG. 2 is a sectional detail of the drawing of FIG. 1 illustrating the locking means utilized to fixedly position a slide member within said slide conduits.

FIG. 3 is a side elevation of the folded frame supporting an infant seat upon a supporting surface such as a tabletop.

FIG. 4 is a sectional detail of FIG. 1 illustrating the manner in which a rigid infant support seat may be molded about the dual slide conduits of the folding support frame.

BEST MODE FOR CARRYING OUT THE INVENTION

Figures 5A, 5B:
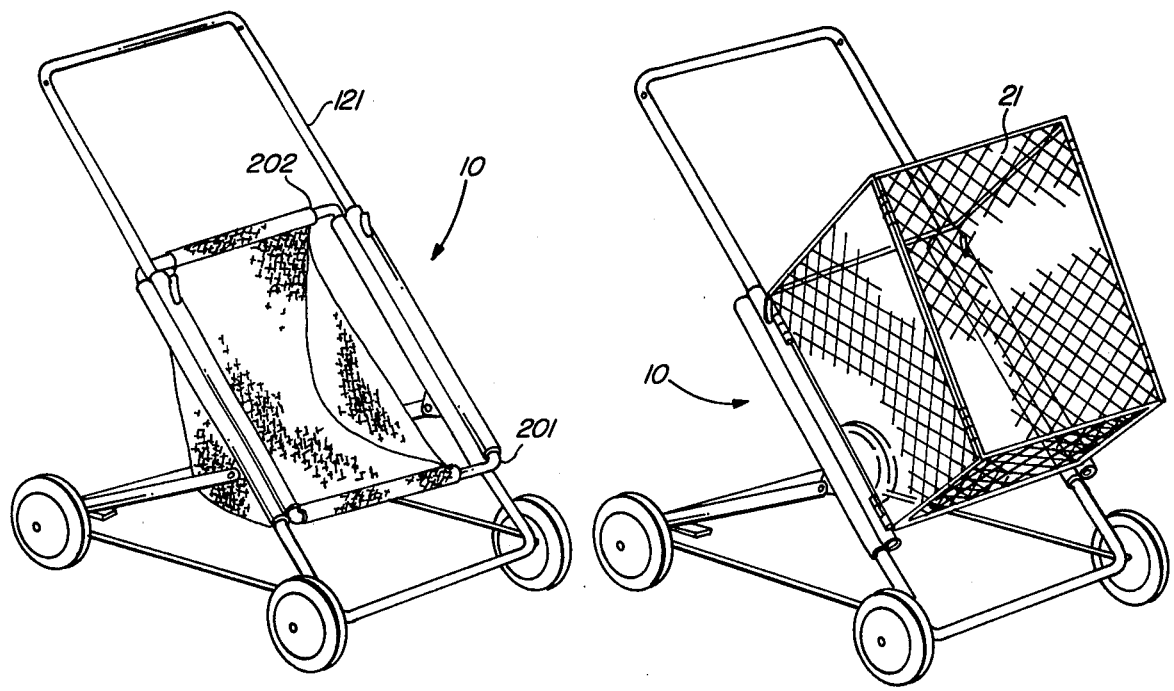
FIGS. 5A–5E illustrate alternate uses of the folding frame other than as a support for an infant seat or carriage.

Prior art folding support frames frequently make use of one support member which slides into a second support member. The size of the second support member is thus determined since it must slidably accept the first support member and cannot thereafter be folded or otherwise reduced in bulk for storage. The folding support frame of the invention, generally designated 10, in FIG. 1 utilizes two slide members 12 comprising an upper slide member 121 and a lower slide member 122 which are slidably accepted into the conduits of dual slide means 11. Dual slide means 11 is comprised of conduits 111 and 112. By way of illustration and not of limitation, lower slide member 122 is shown slidably mated with conduit 112 of slide means 11 and upper slide member 121 is slidably acceptable by conduit 111 of slide means 11.

While slide members 121 and 122 are illustrated as u-shaped members and two dual slide conduits means 11 are utilized in the embodiment of the frame 10 illustrated in FIG. 1, it will be readily recognized by those skilled in the art that a simple, folding frame comprised of a single dual conduit slide means 11 coupled to linear slide members 121 and 122 will provide a useful, folding support structure of great utility.

As seen in the illustration of FIG. 1, a rotating support member 13 is coupled to each of dual conduit slide members 11 by pivotal couplings 14. Linkages 15, comprised of linkage rods 151 and 152, pivotally couple rotating support member 13 to lower slide member 122. Sliding lower slide member 122 in and out of conduits 112 of dual slide conduit means 11 causes rotating support member 13 to rotate about pivotal couplings 14. As seen in the drawing of FIG. 1, pivotal couplings 14 define an axis of rotation transverse to the longitudinal axis of the generally rectangular framework formed by U-shaped slide members 121 and 122. With slide member 122 partially extended from slide conduits 112, rotating support member 13 assumes a position approximately as illustrated in FIG. 1. When lower slide member 122 is inserted fully into conduits 112, rotating support member 13 assumes the approximate position indicated in FIG. 3. Locking means 161 fixedly couple lower slide member 122 to a desired position within slide conduit 112.

When upper slide member 121 is extended from slide conduit 111 as indicated in FIG. 1, means are provided to the user for easy manipulation of support frame 10, cross member 1211 of the u-shaped upper slide member 121 providing handle means which may be grasped by a user. Locking means 162 fixedly position upper slide member 121 within slide conduit 111.

A detail of locking means 161 and 162 is illustrated in detail in FIGS. 2 and 4 under the general reference 16. Locking means 16 comprises a leaf spring member 163 coupled to dual conduit slide means 11. A locking pin 164, affixed to leaf spring member 163, is pressed into holes 165 in dual conduit 11 and slide member 12 to prevent further sliding of slide member 12 within dual conduit 11 in a manner well known to those skilled in the prior art. Manually lifting leaf spring means 163 removes pin 164 from aligned holes 165 and permits slide member 12 to again move within dual conduit slide means 11.

To provide the means for moving support frame 10 easily over a supporting surface, wheels 171 and 172 are provided. Extensions of linkages 15 provide the axial supports for wheels 171 and 172. This is clearly illustrated in FIG. 1 where linkage rod 151 is seen as having an extension 1511 serving as an axle for wheel 171, and a second extension 1512 which provides the axle for wheel 172. Similar extensions on linkage rod 152 are provided as wheel axles.

These extensions lie along the transverse axes of rotation of the U-shaped members 13 and 122 through the points at which they are pivotally coupled.

Brake means 131, coupled to rotating support member 13, may be provided to restrain motion of frame 10 in a manner well known to those skilled in the prior art.

One or more load bearing cross members 20 may be provided to couple the two dual slide conduit means 11 as necessary to satisfy the load bearing requirements of frame 10.

Folding frames of the prior art have been utilized as support for rigid infant seats and the innovative folding frame 10 is admirably suited for this purpose. A rigid, molded infant seat is illustrated in phantom outline in FIG. 1. This infant seat 18 is coupled between the dual conduit slide means 11. In a preferred embodiment of the invention, infant seat 18 is coupled to dual slide means 11 by molding a portion 181 of infant seat 18 about dual conduit slide means 11. This is best illustrated in the cross-sectional view of FIG. 4. A recess 183 in molded portion 181 of infant seat 18, as seen in FIG. 2, provides access to locking means 16.

Rigid infant seats, unsupported by support frames such as frame 10 of the invention, have proven popular with parents since these rigid infant seats provide not only readily transportable means of support for the infant, but also enable the infant to be placed on a tabletop close to the parents as in a restaurant or dining table at home. The folding framework 10 of the invention provides a more compact support structure than any known to the inventor. When a rigid infant seat 18 is coupled to folding framework 10, and that frame structure is folded, the dual conduit slide means 11 provides such a compact package that the infant seat and its supporting framework 10 may be utilized as a conventional unsupported infant seat and safely placed upon a table or other work surface in the vicinity of the parent of an infant emplaced in infant seat 18. To provide greater safety and to prevent movement of infant seat 18 on wheels 171 and 172 when framework 10 is folded, a projection 182 on the base of infant seat 18 is provided so as to raise wheels 171 from the supporting surface. For further safety, projection 182 may be provided with a coating of anti-slip characteristic such as is well known in the prior art. It is thus seen that the advantages of the prior art, highly portable, rigid infant seat are preserved while permitting it to be coupled to a foldable support frame 10 which provides for the conversion of the prior art rigid infant seat into a stroller which may be easily wheeled and maneuvered by a parent of an infant supported by the infant seat 18.

Use of fold-down support frame 10 need not be limited to rigid, molded infant seats 18. FIG. 5A illustrates a flexible, for example canvas, child carrier 19 fastened to load bearing cross bars 201 and 202 which couple the two dual slide conduit means 11.

In FIG. 5B, a fold-down shopping basket is shown coupled between dual conduit slide means 11. With basket 21 and frame 10 in their compact, folded conditions, a shopper is provided with ready and convenient means for carrying his purchases.

Figure 5C:
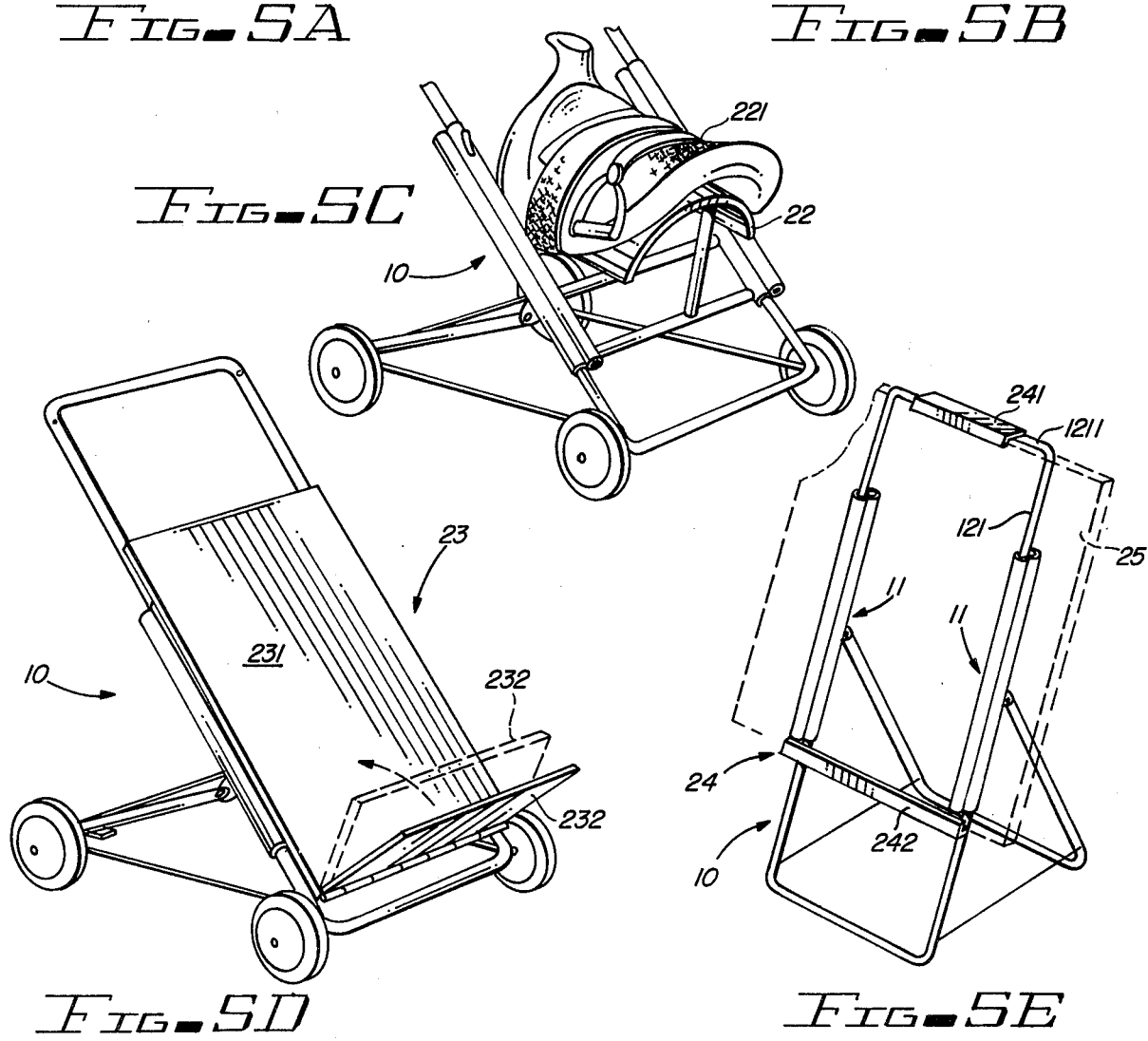

A fold-down saddle-carrier 22 is illustrated supported by fold-down frame 10 in FIG. 5C. Such an arrangement provides easy means for carrying a saddle from a barn to the point at which a horse is to be saddled and yet requires minimal storage space for the frame supported saddle-carrier.

Figure 5D:
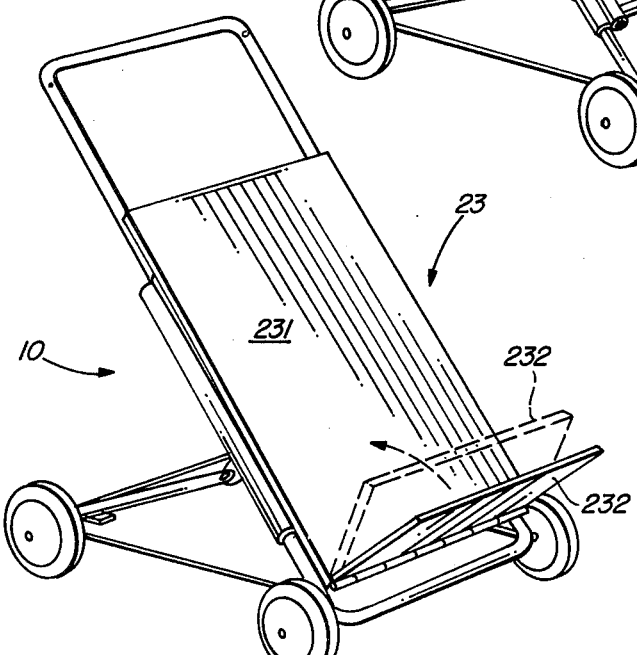

A lightweight dolly cart may be usefully employed in the home for moving items around or in a library for transporting books or the like. Such a lightweight dolly cart 23 comprised of load support surfaces 231 and 232 is illustrated with folding framework 10 in FIG. 5D. Load support surface 232 may be coupled to load support surface 231 so as to fold flat against surface 231 for storage.

Figure 5E:
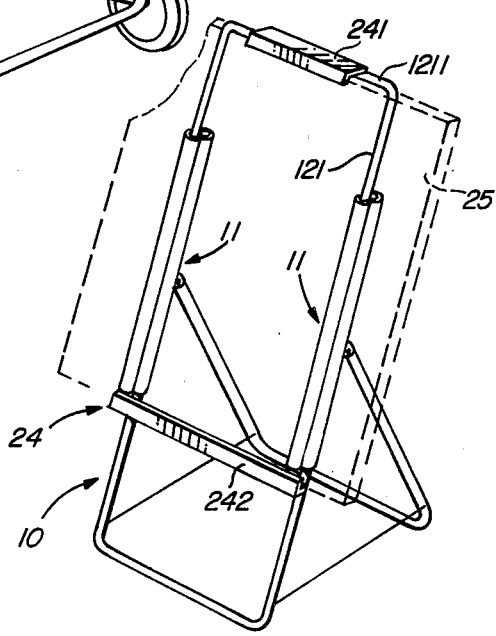

Not all users will require a wheel equipped, fold-down frame. Thus, frame 10 may be utilized to support a display board 25 as illustrated in FIG. 5E. Here, supports 24 are provided to hold display board 25 in a relatively upright position. Support 242 is coupled between dual conduit slide means 11 to support the base of display board 25. A latching support 241 is coupled to the cross member 1211 of upper slide member 121 to engage display board 25 when upper slide member 121 is moved downwards into dual conduit slide means 11. It may be noted that display board 25 may be considered generic of an illustration board being used by a lecturer or an artist's work surface such as a canvas or sketch board.

What has been disclosed is a fold-down support frame which, by use of a dual conduit slide means, enables upper and lower support members to be recessed within the dual conduit slide means so as to provide an extremely compact package.

Those skilled in the art will derive other embodiments drawn from the teachings herein. To the extent that such embodiments are so drawn, it is intended that such embodiments will fall within the ambit of protection provided by the claims set forth hereinafter.

Having described my invention in the foregoing specification and the drawings accompanying it in such a clear and concise manner that those skilled in the art may readily and easily practice the invention, I claim that which is set forth in the following claims:

1. A folding support frame comprising:
   a pair of dual conduit slide means;
   first and a second U-shaped slide members each slidably coupled to each one of said pair of dual conduit slide members to form a generally rectangular framework of selectedly variable size; and
   a U-shaped rotating support member pivotally coupled to said pair of dual conduit slide means for rotation at the open end of the U-shaped rotating support member about an axis transverse to said pair of dual conduit slide means.

2. The folding support frame of claim 1 further comprising:
   U-shaped linkage means pivotally coupled to said U-shaped rotating support member and to said first U-shaped slide member for rotating said U-shaped rotating support member about said transverse axis as said generally rectangular framework is selectedly varied in size.

3. The folding support frame of claim 2 further comprising wheel means coupled to the open ends of said U-shaped linkage means for easing the passage of said folding support frame across a supporting surface.

4. A folding support frame comprising:
   a pair of dual conduit slide means;
   first and second U-shaped slide members each slidably coupled to each one of said pair of dual conduit slide members to form a generally rectangular framework of selectedly variably size;
   a U-shaped rotating support member pivotally coupled to said pair of dual conduit slide means for rotation about an axis through said pair of dual conduit slide means and transverse to the longitudinal axis of said generally rectangular framework formed by the coupling of said first and second U-shaped slide members to said pair of dual conduit slide means; and
   first and second U-shaped linkage members pivotally coupled to said U-shaped rotating support member and to said first U-shaped slide member for rotating said U-shaped support member about said transverse axis as said generally rectangular framewrok is selectedly varied in size.

5. The folding support frame of claim 4 wherein each of said first and second U-shaped linkage members comprise first and second arms said first arms being opposedly pivotally coupled to said U-shaped rotating support member along an axis transverse to the longitudinal axis of said U-shaped rotating support member and said second arms being oppositely pivotally coupled to said first U-shaped slide member along an axis transverse to the longitudinal axis of said first U-shaped slide member.

6. The folding support frame of claim 5 comprising means coupled to at least one of a pair of said first arms of said first and second U-shaped linkage members and a pair of said second arms of said first and second U-shaped linkage members for easing the movement of said support frame across a supporting surface.

7. The folding support frame of claim 6 wherein the means for easing the movement of said support frame across a supporting surface comprise wheel means.

8. The folding support frame of claim 4 further comprising locking means coupled to said first and second U-shaped slide members for fixedly selecting the size of said generally rectangular framework formed by slidingly coupling said first and second U-shaped slide members to each one of said pair of dual conduit slide means.

9. The folding support frame of claim 4 further comprising load support means coupled to said first and second U-shaped slide members for supporting loads within the generally rectangular framework formed by slidably coupling said first and second U-shaped slide members to each one of said pair of dual conduit slide means.

10. The folding support frame of claim 9 said load support means comprising means for supporting a child within said first and said second U-shaped slide members.

11. The folding support frame of claim 10 wherein said means for supporting a child comprises a rigid, molded infant seat.

12. The folding support frame of claim 10 wherein said means for supporting a child comprises a flexible child carrier.

13. The folding support frame of claim 10 further comprising wheel means coupled to said first and second U-shaped linkage members.

14. The folding support frame of claim 13 wherein said means for supporting a child comprises a rigid, molded infant seat having means for inhibiting wheeled movement when said support frame is folded.

15. The folding support frame of claim 9 wherein said load support means comprises basket support means.

16. The folding support frame of claim 9 wherein said load support means comprises a saddle carrier.

17. The folding support frame of claim 9 wherein said load support means comprises at least two support surfaces coupled at approximately right angles one to the other.

18. The folding support frame of claim 9 further comprising wheel means coupled to said first and second U-shaped linkage members.

19. The folding support frame of claim 4 further comprising means coupled to said first and said second U-shaped slide members for supporting a display board.

20. The folding support frame of claim 19 further comprising means coupled to said U-shaped slide members for releasably securing a display board supported by said display board support means.

* * * * *